(12) United States Patent
Deng et al.

(10) Patent No.: US 11,522,381 B2
(45) Date of Patent: Dec. 6, 2022

(54) CHARGING DEVICE AND CHARGING METHOD

(71) Applicant: Positec Power Tools (Suzhou) Co., Ltd, Jiangsu (CN)

(72) Inventors: Qiang Deng, Jiangsu (CN); Mingming Chen, Jiangsu (CN); Xiao Shao, Jiangsu (CN)

(73) Assignee: Positec Power Tools (Suzhou) Co., Ltd, Suzhou (CN)

( * ) Notice: Subject to any disclaimer, the term of this patent is extended or adjusted under 35 U.S.C. 154(b) by 237 days.

(21) Appl. No.: 16/622,595

(22) PCT Filed: Jun. 15, 2018

(86) PCT No.: PCT/CN2018/091631
§ 371 (c)(1),
(2) Date: Dec. 13, 2019

(87) PCT Pub. No.: WO2018/228559
PCT Pub. Date: Dec. 20, 2018

(65) Prior Publication Data
US 2021/0152011 A1    May 20, 2021

(30) Foreign Application Priority Data

Jun. 15, 2017 (CN) .......................... 201710442104.1

(51) Int. Cl.
*H02J 7/00*      (2006.01)
*H01M 50/247*    (2021.01)
(Continued)

(52) U.S. Cl.
CPC ..... *H02J 7/007194* (2020.01); *H01M 10/425* (2013.01); *H01M 10/441* (2013.01);
(Continued)

(58) Field of Classification Search
CPC .. H02J 7/0003; H02J 7/00032; H02J 7/00034; H02J 7/00036; H02J 7/00045;
(Continued)

(56) References Cited

U.S. PATENT DOCUMENTS 5,825,159 A * 10/1998 Patino .................. H02J 7/0071
  320/125
9,748,782 B1 * 8/2017 Sheng .................. H02J 7/0068
(Continued)

FOREIGN PATENT DOCUMENTS

CN          1309436 A      8/2001
CN          1510814 A      7/2004
(Continued)

OTHER PUBLICATIONS

Search Report of Chinese Patent Office in Appl'n No. CN201710442104.1, dated Dec. 5, 2019.
(Continued)

*Primary Examiner* — Zixuan Zhou
(74) *Attorney, Agent, or Firm* — Dentons US LLP

(57) ABSTRACT

Embodiments of the present invention relates to a charging device (and a charging method), the charging device for charging a battery pack, the battery pack being detachably mounted on a power tool to provide power to the power tool, wherein the charging device comprises: a parameter detecting unit configured to detect a parameter related to a charging current for the battery pack, the parameter comprising a temperature of the battery pack; and a control unit configured to adjust the charging current for the battery pack according to output of the parameter detecting unit to prevent the temperature of the battery pack from reaching a first preset temperature, wherein when the temperature of the battery pack reaches the first preset temperature, the battery pack enters an over-temperature protection state, thereby
(Continued)

preventing a life of the battery pack from being affected, By adjusting the charging current, the present invention can not only ensure that the battery pack does not enter over-temperature protection, but also ensure that the charging current of the battery pack is not too small, so that the battery pack has the highest charging efficiency.

14 Claims, 13 Drawing Sheets

(51) Int. Cl.
  *H01M 50/204* (2021.01)
  *H01M 10/42* (2006.01)
  *H01M 10/44* (2006.01)
  *H01M 10/48* (2006.01)

(52) U.S. Cl.
  CPC ....... *H01M 10/443* (2013.01); *H01M 10/482* (2013.01); *H01M 10/486* (2013.01); *H01M 50/204* (2021.01); *H01M 50/247* (2021.01); *H02J 7/0013* (2013.01); *H02J 7/00309* (2020.01); *H01M 2010/4271* (2013.01); *H01M 2220/30* (2013.01)

(58) Field of Classification Search
  CPC .. H02J 7/00047; H02J 7/342; H02J 7/007194; H02J 7/00309; H02J 7/0013; H02J 7/00; H01M 50/247; H01M 50/204; H01M 10/425; H01M 10/441; H01M 10/443; H01M 10/482; H01M 10/486; H01M 2010/4271; H01M 2220/30; H01M 10/44; Y02E 60/10
  USPC ........................................................ 320/112
  See application file for complete search history.

(56) References Cited

U.S. PATENT DOCUMENTS

| | | | |
|---|---|---|---|
| 2001/0006338 A1* | 7/2001 | Yamashita ............ | H02J 7/0086 320/160 |
| 2004/0263119 A1* | 12/2004 | Meyer ................. | H02J 7/00036 320/116 |
| 2006/0214639 A1 | 9/2006 | Miwa et al. | |
| 2011/0121783 A1* | 5/2011 | Boyles ................. | H02J 7/0045 320/113 |
| 2012/0007548 A1* | 1/2012 | Takeshita .............. | H01M 10/42 320/107 |
| 2012/0229078 A1 | 9/2012 | Mack et al. | |
| 2014/0299089 A1* | 10/2014 | Koenen ................... | F04B 17/06 123/179.28 |
| 2015/0283915 A1* | 10/2015 | Kim ....................... | B60L 58/13 320/104 |
| 2016/0204624 A1* | 7/2016 | Small, Jr. ............. | H02J 7/00711 320/139 |
| 2016/0226268 A1* | 8/2016 | Okui ..................... | H02J 7/0014 |
| 2016/0359345 A1 | 12/2016 | Uesugi | |
| 2018/0026472 A1* | 1/2018 | Zhang .................. | H02J 7/0029 320/145 |
| 2018/0262017 A1* | 9/2018 | Hsu ......................... | H02J 7/007 |

FOREIGN PATENT DOCUMENTS

| | | |
|---|---|---|
| CN | 1574447 A | 2/2005 |
| CN | 2905543 Y | 5/2007 |
| CN | 102315660 A | 1/2012 |
| CN | 102709959 A | 10/2012 |
| CN | 104953198 A | 9/2015 |
| CN | 106026327 A | 10/2016 |
| CN | 106208208 A | 12/2016 |
| JP | 2007006628 A | 1/2007 |

OTHER PUBLICATIONS

Search Report of Chinese Patent Office in Appl'n No. CN201880013385.1, dated Dec. 27, 2021.

* cited by examiner

CHARGING DEVICE AND CHARGING METHOD

This application is a National Stage application of International Application No. PCT/CN2018/091631 filed on Jun. 15, 2018, and claims priority to Chinese Application No. 201710442104.1 filed Jun. 15, 2017, each of which is hereby incorporated by reference in its entirety as if fully set forth herein.

BACKGROUND

Technical Field

Embodiments of the present invention relates to the technical field of battery charging, and in particular, to a charging device and a charging method for charging a battery pack.

Related Art

A charging process of an existing battery pack that provides electric power to a power tool includes a constant current charging phase and a constant voltage charging phase. In the constant current charging phase, a fixed current is used to charge the battery pack. During charging, a temperature of the battery pack keeps rising. When an over-temperature protection limitation value is reached, the battery pack stops charging. When the temperature of the battery pack decreases to a value less than the over-temperature protection limitation value, the battery pack restarts charging. When a voltage of the battery pack reaches a voltage threshold, constant voltage charging phase is started. During charging, the temperature of the battery pack rises to the over-temperature protection limitation value a plurality of times. The battery pack stops charging and the battery pack is recharged when the temperature of the battery drops below the over-temperature protection limitation value, resulting in a longer charging duration and lower charging efficiency of the battery pack.

In case of dual-pack charging, in the prior art, a charging method of parallel charging is used, including two control circuits, the two control circuits are used to control charging of a first battery pack and charging of a second battery pack respectively. The two charging circuits do not interfere with each other. In this solution, the first battery pack and the second battery pack are simultaneously charged. During charging, the battery packs are continuously charged using respective charging currents, resulting in over-temperature protection as a result of an excessively high temperature of the battery pack. Consequently, a charging duration of the battery pack is prolonged, and charging efficiency of the battery pack is reduced.

SUMMARY

In order to overcome disadvantages of the prior art, a problem to be resolved in the present invention is to provide a charging device and a charging method, to reduce a charging duration of parallel charging of a plurality of batteries and improve charging efficiency.

The technical solutions used in the present invention to resolve the existing technical problems are as follows.

A charging device for charging a battery pack, the battery pack being detachably mounted on a power tool to provide power to the power tool, wherein the charging device comprises: a parameter detecting unit configured to detect a parameter related to a charging current for the battery pack, the parameter comprising a temperature of the battery pack; and a control unit configured to adjust the charging current for the battery pack according to at least part of an output of the parameter detecting unit, wherein when the temperature of the battery pack reaches the first preset temperature, the charging device enters an over-temperature protection state.

In one embodiment, the parameter detecting unit is further configured to detect a voltage of the battery pack, and the control unit is configured to adjust the charging current for the battery pack according to at least one of the temperature and the voltage of the battery pack output by the parameter detecting unit to prevent the temperature of the battery pack from reaching the first preset temperature.

In one embodiment, the parameter detecting unit is further configured to detect an ambient temperature, and the control unit is configured to adjust the charging current for the battery pack according to at least one of the temperature of the battery pack, the voltage of the battery pack, and the ambient temperature output by the parameter detecting unit, to prevent the temperature of the battery pack from reaching the first preset temperature.

In one embodiment, when the temperature of the battery pack is less than a threshold, the control unit increases the charging current for the battery pack so that the temperature of the battery pack is not less than a second preset temperature.

In one embodiment, the control unit adjusts a value of the charging current for the battery pack by adjusting a duty cycle.

In one embodiment, the charging device comprises a first charging interface and a second charging interface, and the battery pack comprises a first battery pack and a second battery pack, the first battery pack and the second battery pack being electrically connected to the first charging interface and the second charging interface respectively, the control unit controls the charging current to alternately charge the first battery pack and the second battery pack, the parameter detecting unit detects parameters of the first battery pack and the second battery pack respectively, and the control unit adjusts the charging currents for the first battery pack and the second battery pack during charging according to at least part of the output of the parameter detecting unit.

In one embodiment, the charging currents of the first battery pack and the second battery pack are adjusted at least one of the following manner: adjusting values of the charging currents for the first battery pack and the second battery pack and adjusting charging durations of each charging in a process of alternately charging the first battery pack and the second battery pack.

In one embodiment, further comprising a comparison module configured to determine whether a difference between the parameter of the first battery pack and the parameter of the second battery pack is greater than a preset value, wherein if so, the control unit controls a value of a charging current for a battery pack with a larger parameter to be reduced and/or a charging duration of each charging of a battery pack with a larger parameter during the alternate charging to be reduced.

In one embodiment, the control unit comprises a single controller connected to the first battery pack and the second battery pack respectively and configured to control the first battery pack and the second battery pack to be alternately charged.

In one embodiment, a charging process in which the charging device charges the first battery pack and the second battery pack comprises a first charging phase and a second charging phase, wherein a value of a charging current output by the charging device in the first charging phase is greater than a value of a charging current output in the second charging phase, the charging device controls the charging current to alternately charge the first battery pack and the second battery pack in the first charging phase, and controls the charging current to simultaneously charge the first battery pack and the second battery pack in the second charging phase.

In one embodiment, further comprising a storage module configured to store a correspondence table between the parameter and the charging current, the control unit controls the charging current for the battery pack according to the correspondence table.

A charging method for charging a battery pack, the battery pack being detachably mounted on a power tool to provide power to the power tool, wherein the charging method comprises: detecting a parameter related to a charging current for the battery pack, the parameter comprising a temperature of the battery pack; and adjusting the charging current for the battery pack according to at least part of a detected parameter, wherein when the temperature of the battery pack reaches the first preset temperature, a charging device enters an over-temperature protection state.

In one embodiment, the parameter further comprises a voltage of the battery pack, and the step of adjusting the charging current for the battery pack according to at least part of a detected parameter comprises: adjusting the charging current for the battery pack according to at least one of the temperature and the voltage of the battery pack.

In one embodiment, the parameter further comprises an ambient temperature, and the step of adjusting the charging current for the battery pack according to at least part of a detected parameter comprises: adjusting the charging current for the battery pack according to at least one of the temperature of the battery pack, the voltage of the battery pack, and the ambient temperature.

In one embodiment, further comprising: when the temperature of the battery pack is less than a threshold, the control unit increases the charging current the battery pack so that the temperature of the battery pack is not less than a second preset temperature.

In one embodiment, the charging device comprises a first charging interface and a second charging interface, and the battery pack comprises a first battery pack and a second battery pack, the first battery pack and the second battery pack being electrically connected to the first charging interface and the second charging interface respectively, and the charging method comprises: controlling the charging current to alternately charge the first battery pack and the second battery pack; detecting parameters of the first battery pack and the second battery pack respectively; adjusting charging currents for the first battery pack and the second battery pack during charging according to at least part of the output of a parameter detecting unit.

In one embodiment, the charging currents for the first battery pack and the second battery pack are adjusted at least one of the following manner: adjusting values of the charging currents for the first battery pack and the second battery pack and adjusting charging durations of each charging in a process of alternately charging the first battery pack and the second battery pack.

In one embodiment, further comprising: determining whether a difference between the parameter of the first battery pack and the parameter of the second battery pack is greater than a preset value; and if so, controlling, by the control unit, a value of a charging current for a battery pack with a larger parameter to be reduced and/or a charging duration of each charging of a battery pack with a larger parameter during the alternate charging to be reduced.

In one embodiment, a charging process in which the charging device charges the first battery pack and the second battery pack comprises a first charging phase and a second charging phase, wherein a value of a charging current output by the charging device in the first charging phase is greater than a value of a charging current output in the second charging phase, the charging device controls the charging current to alternately charge the first battery pack and the second battery pack in the first charging phase, and controls the charging current to simultaneously charge the first battery pack and the second battery pack in the second charging phase.

In one embodiment, further comprising: pre-storing a correspondence table between the parameter and the charging current, and controlling the charging current for the battery pack according to the correspondence table.

Compared to the prior art, the present embodiment has the following beneficial effects: A charging current is adjusted according to internal and external parameters of a battery pack to prevent the battery pack from frequently entering over-temperature protection as a result of an excessively high temperature. A specific time period is required for the battery pack to cool down and then to be recharged, prolonging a charging duration. A temperature of the battery pack is limited to a temperature not less than a second preset temperature, so that a control unit can be prevented from excessively reducing the charging current for the battery pack. Although the battery pack does not enter over-temperature protection, the battery pack needs to spend a longer time to reach a second charging phase as a result of an excessively small charging current, affecting charging efficiency. In the present embodiment, two battery packs are further controlled to be alternately charged, and charging currents of the two battery packs and an alternate charging interval are adjusted, so that the temperature of the battery pack is limited between optimal first preset temperature and second preset temperature, reducing the charging duration and achieving relatively high charging efficiency.

BRIEF DESCRIPTION OF THE DRAWINGS

The objectives, technical solutions and beneficial effects of embodiments of the present invention described above can be implemented through the following accompanying drawings.

DETAILED DESCRIPTION

For ease of understanding the embodiment of the present invention, the present invention is described in further detail below with reference to the accompanying drawings and specific embodiments. The accompanying drawings show preferred embodiments of the present invention. However, the present invention can be implemented in various different forms, and is not limited to the embodiments described in this specification. Conversely, the embodiments are described for the purpose of providing a more thorough and comprehensive understanding of the content disclosed in the present invention.

Unless otherwise defined, meanings of all technical and scientific terms used in this specification are the same as that usually understood by a person skilled in the technical field to which the present invention belongs. In this specification, terms used in the specification of the present invention are merely intended to describe objectives of the specific embodiments, but are not intended to limit the present invention. A term "and/or" used in this specification includes any or all combinations of one or more related listed items.

The embodiment of the present invention provides a charging device for charging a battery pack. The battery pack is detachably mounted on a power tool to provide power to the power tool.

Figure 1:
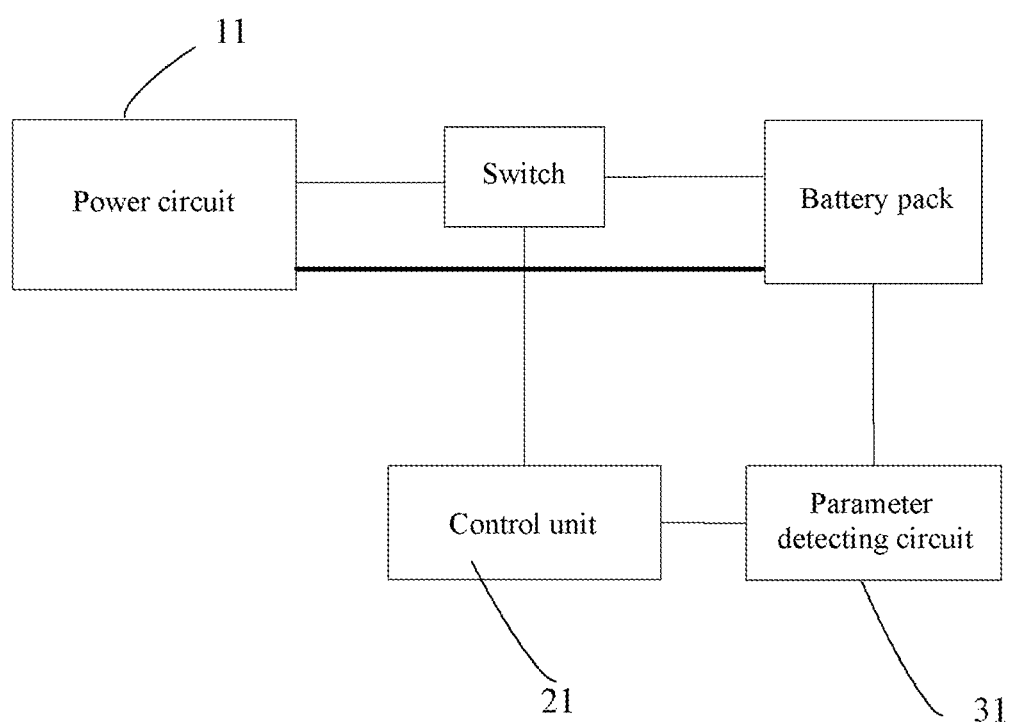
FIG. 1 is a schematic structural diagram of a charging device according a first embodiment and a second embodiment of present invention.

In a first embodiment of the present invention, referring to FIG. 1, the charging device includes a power circuit 11, a control unit 21, and a parameter detecting unit 31. The parameter detecting unit 31 is configured to detect internal and external parameters of the battery pack. The parameter is related to a charging current for the battery pack. In this embodiment, the parameter includes a temperature of the battery pack. The control unit 21 is electrically connected to the parameter detecting unit 31 and receives the parameters detected by the parameter detecting unit 31. The control unit 21 adjusts the charging current for the battery pack according to the detected parameter to prevent the temperature of the battery pack from reaching a first preset temperature. When the temperature of the battery pack reaches the first preset temperature, the battery pack enters an over-temperature protection state.

In the embodiment, an over-temperature protection limitation value of the battery pack is preset to a first preset temperature. The temperature of the battery pack is detected in real time during charging, and the charging current is adjusted through detection of the temperature of the battery pack so that the temperature of the battery pack does not exceed the first preset temperature, thereby preventing a life of the battery pack from being affected and a charging duration of the battery pack from being prolonged as a result of entering of over-temperature protection.

In the first embodiment, the parameter detecting unit 31 may be further configured to detect a voltage of the battery pack. The control unit 21 adjusts the charging current for the battery pack according to the temperature and the voltage of the battery pack to prevent the battery pack from entering the over-temperature protection state as a result of reaching of the first preset temperature during the charging.

In the first embodiment, the parameter detecting unit 31 may be further configured to detect an ambient temperature of the battery pack. The control unit 21 adjusts the charging current for the battery pack according to the temperature of the battery pack, the voltage of the battery pack, and the ambient temperature to prevent the battery pack from entering the over-temperature protection state as a result of reaching of the first preset temperature during the charging.

In a second embodiment of the present invention, the control unit 21 adjusts the charging current for the battery pack according to the parameter of the battery pack detected by the parameter detecting unit 31. The parameter of the battery pack may be the temperature of the battery pack, a combination of the temperature and the voltage of the battery pack, or a combination of the temperature, the voltage, and the ambient temperature of the battery pack. When the temperature of the battery pack is less than a threshold, the control unit increases the charging current for the battery pack, and limits the temperature of the battery pack between the first preset temperature and a second preset temperature. In the embodiment of the present invention, the threshold may be a fixed temperature or a fluctuating and unfixed temperature. In actual operation, a value of the threshold may be determined according to an actual condition.

In the second embodiment, the temperature of the battery pack keeps increasing during the charging. When the temperature of the battery pack reaches a specific threshold temperature T, the control unit 21 reduces the charging current for the battery pack, so that the temperature of the battery pack decreases. When the temperature of the battery pack decreases to a threshold value, the control unit 21 increases the charging current for the battery pack so that the temperature of the battery pack rises, and the temperature of the battery pack is limited between the first preset temperature and the second preset temperature. The first preset temperature is greater than the second preset temperature, and the threshold temperature T is a fluctuating temperature. In actual operation, a value of the threshold temperature T may be determined according to a factor such as a type or an ambient temperature of the battery pack.

In the second embodiment, the control unit 21 adjusts the internal and external parameters of the battery pack, such as the ambient temperature, the temperature, the voltage, and other parameters of the battery pack, to limit the temperature of the battery pack between the first preset temperature and the second preset temperature, so that the battery pack can be prevented from entering over-temperature protection in that the temperature of the battery pack is greater than the first preset temperature. The battery pack entering over-temperature protection needs to wait for a specific time period for the temperature of the battery pack to decrease, and when the temperature is less than the first preset temperature, the battery pack restarts charging. The waiting process prolongs the charging duration of the battery pack. In this embodiment, the temperature of the battery pack is limited to be not less than the second preset temperature, to prevent the charging device from excessively reducing the charging current during adjustment of the charging current for the battery pack. In case of a relatively small charging current, although the battery pack does not enter over-temperature protection, the battery pack needs to spend a longer time to reach a preset voltage as a result of the relatively small charging current, that is, a charging duration of the battery pack is prolonged. Therefore, limiting the temperature of the battery pack between the first preset temperature and the second preset temperature can enable the battery pack to be charged for a shortest charging without a need to enter over-temperature protection.

In the first embodiment and the second embodiment, the current may be adjusted by the control unit 21 by adjusting a duty cycle, and then a value of the charging current for the battery pack is adjusted.

In the first embodiment and the second embodiment, the charging device may charge one battery pack. In order to achieve higher charging efficiency, the charging device may charge at least two battery packs, that is, the charging device may charge a first battery pack and a second battery pack.

In a third embodiment of the present invention, the charging device includes a first charging interface and a second charging interface, and the battery pack includes a first battery pack and a second battery pack. The first battery pack and the second battery pack are electrically connected to the first charging interface and the second charging interface respectively. The control unit 21 controls the charging current to alternately charge the first battery pack and the second battery pack. The parameter detecting unit 31 detects parameters of the first battery pack and the second battery pack respectively, and the control unit 21 adjusts charging currents of the first battery pack and the second battery pack during the charging according to output of the parameter detecting unit 31 to prevent temperatures of the first battery pack and the second battery pack from reaching the first preset temperature.

Figure 2:
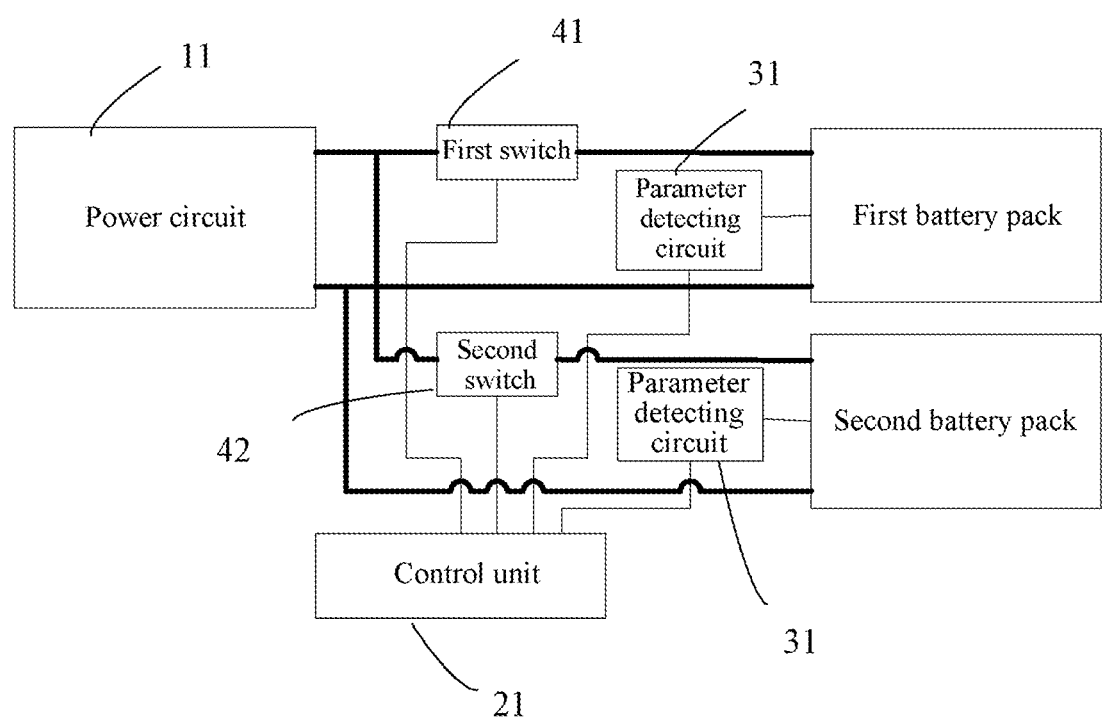
FIG. 2 is a schematic structural diagram of a charging device according a second embodiment and a fourth embodiment of present invention.

In particular, referring to FIG. 2, the power circuit 11 is connected to the first battery pack through a first switch 41, and is connected to the second battery pack through a second switch 42. The control unit 21 is electrically connected to the first switch 41 and the second switch 42 respectively. The control unit 21 alternately and cyclically controls closing of the first switch 41 and the second switch 42 to alternately charge the first battery pack and the second battery pack, that is, after the first battery pack is charged for a specific time period, the control unit 21 controls the first switch 41 to be open to stop charging the first battery pack. The control unit 21 controls the second switch 42 to be closed, to start to charge the second battery pack. Through alternate control of closing of the first switch 41 and the second switch 42, the control unit 21 alternatively charges the first battery pack and the second battery pack, so that the second battery pack may be cooled during the charging of the first battery pack, thereby preventing a life and charging efficiency of the second battery pack from being affected in that a temperature of the second battery pack continuously rises to the first preset temperature. In the present invention, the control unit 21 adjusts a charging current for the corresponding battery pack according to the parameters of the first battery pack and the second battery pack detected by the parameter detecting unit 31. The parameter of the battery pack may be the temperature of the battery pack, a combination of the temperature and the voltage of the battery pack, or a combination of the temperature, the voltage, and the ambient temperature of the battery pack. In this embodiment, through adjustment of the current, the temperatures of the first battery pack and the second battery pack are always near the first preset temperature but do not exceed the first preset temperature, so that the first battery pack and the second battery pack to be charged for a shortest duration and have highest charging efficiency without a need to enter over-temperature protection.

In the third embodiment, the first battery pack and the second battery pack are alternately charged, so that only one battery pack is in a charging state each time. Therefore, not only the battery pack in a charging state can be charged with a maximum charging current provided by the charging device, but also the temperature of the battery pack can be prevented from rising to the first preset temperature through alternate charging. In a charging-waiting-charging process, the battery pack can be charged with a relatively high current in the charging phase, the temperature of the battery pack decreases in the waiting phase, and charging continues with the charging current in the charging phase, not only preventing the battery pack from entering over-temperature protection, but also reducing the charging duration. The temperature of the battery pack rises, and the battery pack enters the over-temperature protection state. Therefore, high-efficiency charging of the battery pack is ensured. During alternate charging, when a value of a charging current for one of the battery packs in the charging phase in the charging-waiting-charging process is excessively large, a temperature of the battery pack decreases only a little even if there is a waiting phase, and may still reach the first preset temperature in a next charging process. Therefore, in order to prevent the temperatures of the first battery pack or the second battery pack from reaching the first preset temperature during the alternate charging, the battery pack enters over-temperature protection, and then enters a waiting state to wait for the temperature of the battery pack to decrease, prolonging the charging duration of the battery pack. In the present invention, during the alternate charging, charging currents for the first battery pack and the second battery pack are adjusted respectively to prevent the temperature of the battery pack rising in the charging phase from failing to decrease in the waiting phase, so that neither the first battery pack nor the second battery pack enters the over-temperature protection state, reducing the charging duration and improving the charging efficiency of the two battery packs.

In the foregoing embodiments, the charging currents for the first battery pack and the second battery pack are adjusted through adjustment of values of the charging currents for the first battery pack and the second battery pack or a charging duration of each charging in a process of alternately charging the first battery pack and the second battery pack or through adjustment of both values of the charging currents for the first battery pack and the second battery pack and a charging duration of each charging in a process of alternately charging the first battery pack and the second battery pack. In the embodiment of the present invention, adjusting the values of the charging currents for the first battery pack and the second battery pack can avoid an excessively large charging current and prevent the temperature of the battery pack from rising excessively fast, and adjusting an alternate charging interval can enable the temperature of the first battery pack or the second battery pack to decrease in the waiting period, so that the first battery pack or the second battery pack can be charged with a relatively large charging current. Through intelligent adjustment of the alternate charging interval or an alternate charging duration, the battery pack can achieve highest charging efficiency.

In particular, in a fourth embodiment of the present invention, a charging device is provided. Referring to FIG. 2, different from the third embodiment, the control unit 21 adjusts a charging duration of a corresponding battery pack according to a parameter of each battery pack detected by the parameter detecting unit 31, that is, the control unit 21 controls the first battery pack and the second battery pack to be alternately charged. The control unit 21 controls the first switch 41 to be open after the charging duration of the first battery pack reaches T1 to stop charging the first battery pack, and the control unit 21 controls the second switch 42 to be closed to start to charge the second battery pack. After the charging duration reaches T2, the control unit 21 controls the second switch 42 to be open to stop charging the second battery pack, and the control unit 21 controls the first battery pack to start to be charged. T1 and T2 are determined by the control unit 21 according to the parameters of the first battery pack and the second battery pack. In the embodiment of the present invention, the values of the charging currents for the first battery pack and the second battery pack and the charging durations T1 and T2 or a ratio thereof during charging are determined based on a temperature difference or a voltage difference between the first battery pack and the second battery pack.

In the embodiment, the values of the charging currents in the process of alternately charging the first battery pack and the second battery pack and the charging duration during the alternate charging are determined according to the parameters of the battery packs, and the temperatures of the battery packs are adjusted according to a value of an interval to prevent lives and charging efficiency of the battery packs from being affected in that the temperatures of the battery packs reach the first preset temperature.

In a fifth embodiment of the present invention, on the basis of the third embodiment and the fourth embodiment, a comparison module is further included. The comparison module is configured to determine whether a difference between the parameter of the first battery pack and the parameter of the second battery pack is greater than a preset value. If the parameter of the first battery pack is greater than the parameter of the second battery pack, and the difference between the parameters of the two battery packs is greater than the preset value, the control unit controls the charging current for the first battery pack to decrease and the charging duration to decrease, and control the charging current for the second battery pack to remain unchanged, but the charging duration to increase.

In this embodiment, a switching time of the alternate charging is adjusted according to the difference between the parameters of the battery pack. A charging current for a battery pack with a higher temperature or voltage is reduced, and a charging duration is reduced. A charging duration of a battery pack with a lower temperature or voltage is prolonged. In this way, the battery pack with a higher temperature can be cooled during charging of the battery pack with a lower temperature to cause a temperature thereof decrease, thereby preventing charging efficiency from being affected in that the temperature of high-temperature battery pack continues to rise and the battery pack enters over-temperature protection.

In the foregoing embodiment, the parameter of the battery pack may be the temperature alone, that is, a value of a charging current for each battery pack or an alternate charging interval during the alternate charging is adjusted according to the temperature difference between the two battery packs, or values of charging currents for the two battery packs and the alternate charging interval during the alternate charging are all adjusted according to the temperature difference between the two battery packs. The parameters of the battery pack may also be temperature and the voltage. A value of a charging current for each battery pack or an alternate charging interval during the alternate charging is adjusted according to the temperature difference and the voltage difference between the two battery packs, or values of charging currents for the two battery packs and the alternate charging interval during the alternate charging are all adjusted according to the temperature difference and the voltage difference between the two battery packs. For example, a determining condition is as follows: 1. It is determined whether the temperature of the first battery pack is greater than the temperature of the second battery pack and whether the temperature difference between the two battery packs reaches a first preset value; 2. It is determined whether the voltage of the first battery pack is greater than the voltage of the second battery pack and whether the voltage difference between the two battery packs reaches a second preset value.

When the temperatures and the voltages of the first battery pack and the second battery pack meet the condition 1, the value of the charging current for the first battery pack and the charging duration of the first battery pack are controlled to decrease, and the charging current for the second battery pack is controlled to remain unchanged, and the charging duration is controlled to increase. If the temperatures and the voltages of the first battery pack and the second battery pack do not meet the condition 1, it is determined whether the voltages and the temperatures of the first battery pack and the second battery pack meet the condition 2. If the voltages and the temperatures of the first battery pack and the second battery pack meet the condition 2, both the value of the charging current for the first battery pack and the charging duration of the first battery pack are controlled to decrease, the charging current for the second battery pack is controlled to remain unchanged, and the charging duration is controlled to increase.

In the foregoing embodiment, the control unit further controls the charging current for the battery pack according to the ambient temperature. When the ambient temperature is high, the charging current is correspondingly controlled to decrease to prevent the battery pack from entering an over-temperature protection state. When the ambient temperature is low, the charging current is correspondingly controlled to increase to improve the charging efficiency.

In the foregoing third to fifth embodiments, when the two charging interfaces of the charging device are first connected to the first battery pack, the parameter detecting unit detects the parameter of the first battery pack, and controls the charging current for the first batter pack according to the parameter of the first battery pack. When the charging device is connected to the second battery pack, the parameter detecting unit detects the parameter of the first battery pack and the parameter of the second battery pack, and transmits the parameters to the comparison module. The comparison module compares the parameters of the two battery packs. If one of the battery packs is a high-temperature battery pack, and the other of the battery packs is a low-temperature battery pack, the control unit controls the low-temperature battery pack to be charged first, and stops charging when the threshold temperature is reached. In this case, a temperature of the high-temperature battery pack is less than the first preset temperature. The control unit is switched to start to charge the high-temperature battery pack, and determines a value of the charging current according to the parameter of the high-temperature battery pack, and determines an alternate charging interval according to a temperature difference between the two battery packs.

In a sixth embodiment of the present invention, the control unit includes a controller. The first battery pack is connected to the controller through the first switch, and the second battery pack is connected to the controller through the second switch. The controller alternately controls closing of the first switch and the second switch. When the controller controls the first switch to be closed, the first battery pack is charged. After the charging duration T1, the controller controls the first switch to be open and the second switch to be closed, and the second battery pack starts to be charged. In the embodiment of the present invention, the two battery packs are controlled to be alternately charged through a controller, so that not only relatively high charging efficiency can be achieved and but also costs are reduced.

After the first charging phase in the foregoing third to fifth embodiments, the second charging phase is further included, that is, after the voltages of the first battery pack and the second battery pack detected by the parameter detecting unit both reach a voltage threshold, the control unit controls the first battery pack and the second battery pack to be switched from the first charging phase of the alternate charging to the second charging phase. In the second charging phase, the first battery pack and the second battery pack are charged in parallel with a constant voltage. If a voltage of one of the battery packs reaches the voltage threshold first, the battery pack enters a rest device, and the other of the battery packs is charged alone. After the voltages of the battery packs both reach the voltage threshold, the two battery packs enter a constant voltage charging phase together.

Those skilled in the art may learn that, in the second charging phase, the first battery pack and the second battery pack are successively charged within a specific time period. For example, second charging phase-charging of the second battery pack starts after second charging phase-charging of the first battery pack lasts for 0.05 s. the first battery pack and the second battery pack can be simultaneously charged in parallel.

In the foregoing embodiment, the voltage threshold may be a fixed voltage value or a fluctuating voltage value, and a duration of the second charging phase is greater than a charging duration of the battery pack in the first charging phase. If the two battery packs are successively charged with a constant voltage, each battery pack needs a constant voltage charging phase. In this case, a relatively long time is required to complete charging of both the two battery packs. The controller of the embodiments of the present invention controls the first battery pack and the second battery pack to simultaneously enter the constant voltage phase, reducing a duration of the constant-voltage charging phase of the two battery packs and improving the charging efficiency.

In particular, in a seventh embodiment of the present embodiment, the parameter detecting unit detects the parameters of the first battery pack and the second battery pack, and determines whether the temperatures of the first battery pack and the second battery pack reach the first preset temperature. If yes, a battery pack that reaches the first preset temperature enters over-temperature protection, and a charging current for the other of the battery packs is controlled according to the parameters detected by the parameter detecting unit. If the temperatures of the first battery pack and the second battery pack are both less than the first preset temperature, the control unit controls the first switch connected to the first battery pack to be closed. The control unit searches a correspondence table between the parameter of the battery pack and the charging current stored in the storage module for a charging current for the first battery pack, and controls the first battery pack to be charged with the charging current for a preset charging duration. When the first battery pack reaches the preset charging duration, the control unit controls the first switch to be open, so that the charging device stops charging the first battery pack. In addition, the control unit controls the second switch to be closed, and the control unit searches the correspondence table stored in the storage module for a charging current for the second battery pack, and controls the second battery pack to be charged with the charging current for a preset charging duration. After the preset charging duration is reached, the control unit controls the second switch to be open, and controls the first switch to be closed, so as to alternately charge the first battery pack and the second battery pack. During the charging, the parameter detecting unit detects the voltages of the first battery pack and the second battery pack. When a voltage of one of the battery packs reaches the voltage threshold, the battery pack enters a rest mode, and the control unit searches, according to the parameters detected by the parameter detecting unit, the table to obtain a charging current for the other of the battery packs. After controlling the other of the battery packs to be continuously charged to the voltage threshold, the control unit closes both the first switch and the second switch to control the first battery pack and the second battery pack to be charged in parallel. After an end-of-charge voltage is reached, charging is stopped.

In the foregoing embodiment, if the temperature of the first battery pack is greater than the first preset temperature, the control unit controls the second battery pack to be continuously charged alone, and detects whether the temperature of the first battery pack is less than the first preset temperature during the charging, If the temperature of the first battery pack is less than the first preset temperature in the first charging phase, the control unit controls the first battery pack and the second battery pack to be alternately charged. After the voltage threshold is reached, the control unit controls the first battery pack and the first battery pack to be simultaneously charged with a constant voltage. If a calculated temperature of the first battery pack is still greater than the first preset temperature when the second battery pack is fully charged, the control unit controls the second battery pack to be fully charged before controlling the first battery pack to be charged.

Figure 3:
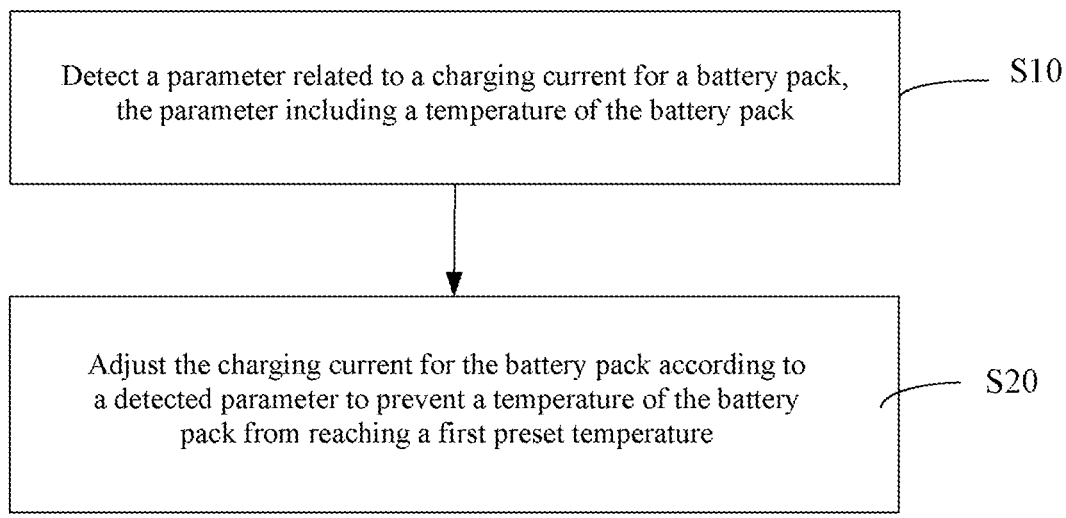
FIG. 3 is a schematic flowchart of an eighth embodiment of a charging method according to the present invention.

In an eighth embodiment of the present invention, referring to FIG. 3, a charging method for charging a battery pack is provided. The battery pack is detachably mounted on a power tool to provide power to the power tool. The charging method includes:

S10: A parameter related to a charging current for the battery pack is detected, the parameter including a temperature of the battery pack; and S20: The charging current for the battery pack is adjusted according to a detected parameter to prevent a temperature of the battery pack from reaching a first preset temperature. When the temperature of the battery pack reaches the first preset temperature, the battery pack enters an over-temperature protection state.

In the foregoing embodiment, the parameter may be the temperature of the battery pack, a combination of the temperature and a voltage of the battery pack, or a combination of the temperature, the voltage, and an ambient temperature of the battery pack.

The embodiments of the present invention further provides a charging method in which the charging device in any of the foregoing second to seventh embodiments is used. In particular, on the basis of the eighth embodiment, the method further includes a step of:

when the temperature of the battery pack is less than a threshold, increasing, by the control unit, the charging current for the battery pack, and limiting the temperature of the battery pack between the first preset temperature and a second preset temperature.

In the embodiments of the present invention, the charging current for the battery pack is adjusted through adjustment of a duty cycle.

In an embodiment of the present invention, the charging device includes a first charging interface and a second charging interface respectively connected to a first battery pack and a second battery pack. The charging method further includes:

alternately controlling the first battery pack and the second battery pack to be charged in a first charging phase; and when there are two battery packs, alternately charging, by the charging device, the first battery pack and the second battery pack. In the foregoing embodiments, the charging currents for the first battery pack and the second battery pack are adjusted through adjustment of values of the charging currents for the first battery pack and the second battery pack or a charging duration of each charging in a process of alternately charging the first battery pack and the second battery pack or through adjustment of both values of the charging currents for the first battery pack and the second battery pack and a charging duration of each charging in a process of alternately charging the first battery pack and the second battery pack. In the embodiment of the present invention, adjusting the values of the charging currents for the first battery pack and the second battery pack can avoid an excessively large charging current and prevent the temperature of the battery pack from rising excessively fast, and adjusting an alternate charging interval can enable a temperature of the first battery pack or the second battery pack to decrease in a waiting period, so that the first battery pack or the second battery pack can be charged with a relatively large charging current. Through intelligent adjustment of the alternate charging interval or an alternate charging duration, the battery pack can achieve highest charging efficiency.

Further, when values of parameters of the first battery pack and the second battery pack are significantly different, it is determined whether a difference between a temperature of the first battery pack and a temperature of the second battery pack is beyond a preset range. In other words, it is determined whether the temperature of the first battery pack is greater than the temperature of the second battery pack and whether a difference is greater than a preset range. If so, the charging current for the first battery pack is controlled to decrease, and a charging duration is controlled to decrease, the charging current for the second battery pack is controlled to remain unchanged, and a charging duration is controlled to increase. In the embodiments of the present invention, the charging current and the charging duration of the first battery pack with a higher temperature first battery pack are reduced, and the charging current for the second battery pack with a lower temperature is unchanged, and a charging duration is increased, so that both the first battery pack and the second battery pack can reach relatively high charging efficiency and do not enter over-temperature protection.

In the foregoing embodiment, it is predetermined at the beginning of each charging cycle whether the temperature difference between the first battery pack and the second battery pack is beyond the preset range. If so, it means that a temperature of one of the battery packs is relatively excessively high. Therefore, a charging current and a charging duration of the battery pack with a higher temperature are reduced, and a charging duration of a battery pack with a lower temperature is increased. In this embodiment, during the charging, values of the charging currents and the charging durations of the two battery packs may be intelligently adjusted to avoid the following case: a temperature of one of the battery packs is excessively high and reaches an over-temperature protection limitation value, resulting in stopping of charging, thus affecting a duration of completing charging of the two battery packs and charging efficiency.

Further, the parameter further includes a voltage, and a determining condition is as follows: It is determined whether a difference between the voltage of the first battery pack and the voltage of the second battery pack is beyond a preset range; and if so, a charging current and a charging duration of a battery pack with a higher voltage are reduced, a charging current for a battery pack with a lower voltage remains unchanged, and a charging duration is increased. A specific control method is the same as a control method in the foregoing embodiment, and details are not described herein again. In this embodiment, at the beginning of each charging cycle, it is predetermined whether the voltage difference between the first battery pack and the second battery pack is beyond the preset range. If so, it indicates that a voltage of one of the battery packs is excessively high, and therefore a charging current and a charging duration of the battery pack with a higher voltage is reduced. In addition, a charging duration of a battery pack with a lower voltage is increased, to avoid the following case: the battery pack with a higher voltage completes the first charging phase excessively quickly relative to low-voltage battery packs, causing the battery pack with a lower temperature to have an excessively high temperature that reaches the over-temperature protection value as a result of alone charging in the first phase alone, thus resulting in stopping of charging. Therefore, in this embodiment, the charging currents and the charging durations of the two battery packs are adjusted in each cycle to alternately charge the two battery packs as much as possible, thereby improving the charging efficiency and reducing the charging durations.

Figure 4:
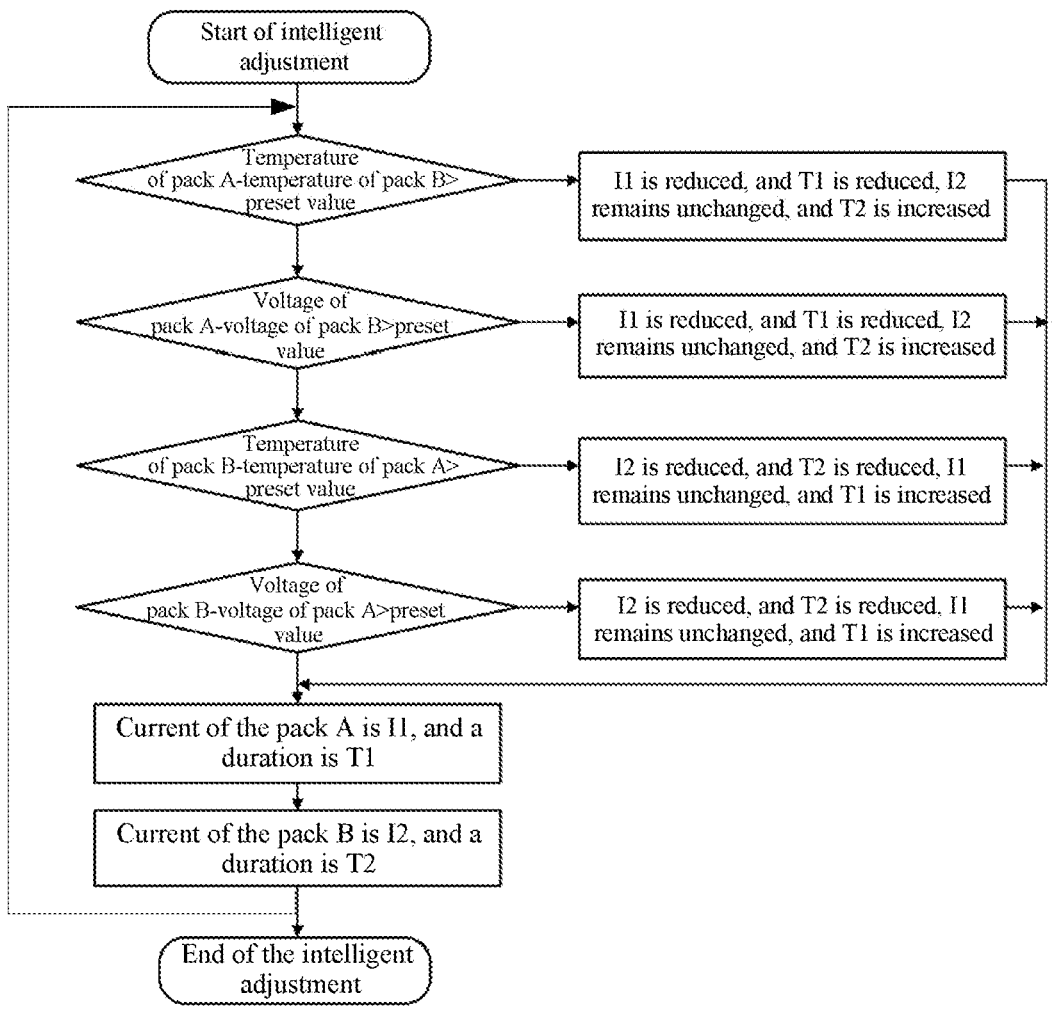
FIG. 4 is a schematic flowchart of a first charging phase of a charging method according to the present invention.

Further, the parameter includes a temperature and a voltage. A determining condition is as follows: 1. It is determined whether the temperature of the first battery pack is greater than the temperature of the second battery pack and whether the temperature difference between the two battery packs reaches a first preset value; 2. It is determined whether the voltage of the first battery pack is greater than the voltage of the second battery pack and whether the voltage difference between the two battery packs reaches a second preset value. In particular, referring to FIG. 4, two battery packs A and B are respectively connected to two battery pack interfaces of the charging device. When charging is started, it is determined whether a temperature of the pack A is greater than a temperature of the pack B and whether a temperature difference between the pack A and the pack B is greater than a preset value. If so, a charging current I1 for the pack A is reduced, and a charging duration T1 is reduced, a charging current I2 for the pack B remains unchanged, and a charging duration T2 is increased. Otherwise, it is then determined whether a voltage of pack A is greater than a voltage of pack B and whether a voltage difference between the pack A and the pack B is greater than a preset value. If the voltage difference between the pack A and the pack B is greater than the preset value, the charging current I1 for the pack A is controlled to be reduced, and the charging duration T1 is reduced, the charging current I2 for the pack B remains unchanged, and the charging duration T2 is increased. If the voltage difference between the pack A and the pack B is not greater than the preset value, it is determined whether the temperature of the pack B is greater than the temperature of the pack A and whether the temperature difference between the pack B and the pack A is greater than the preset value. If so, the charging current I2 for the pack B is reduced, and the charging duration T2 is reduced, the charging current I1 for the pack A remains unchanged, and the charging duration T1 is increased. If the temperature difference between the pack B and the pack A is not greater than the preset value, it is determined whether the voltage of the pack B is greater than the voltage of the pack A and whether the voltage difference between the pack B and the pack A is greater than the preset value. If so, the charging current I2 for the pack B is reduced, and the charging duration T2 is reduced, the charging current I1 for the pack A remains unchanged, and the charging duration T1 is increased. Otherwise, if none of the foregoing conditions is met, the charging current for and the charging duration of the pack A are controlled to remain unchanged, and the charging current for and the charging duration of the pack B are controlled to remain unchanged.

In the foregoing embodiments, setting more accurate charging currents for and charging durations of the first battery pack and the second battery pack concerns whether the first battery pack and the second battery pack can be charged with highest efficiency. If an excessively large charging current is set, a service life of the battery pack may be affected. If an excessively small charging current is set, the charging duration is prolonged. Therefore, setting a suitable charging current is extremely important.

After the first charging phase in the foregoing embodiments of the charging method, a second charging phase is further included, that is, after the voltages of the first battery pack and the second battery pack both reach a voltage threshold, the first battery pack and the second battery pack are controlled to be switched from the first charging phase to the second charging phase. In the second charging phase, the first battery pack and the second battery pack are charged in parallel with a constant voltage. If a voltage of one of the battery packs reaches the voltage threshold first, the battery pack enters a rest device, and the other of the battery packs is charged alone. After the voltages of the battery packs both reach the voltage threshold, the two battery packs enter a constant voltage charging phase together.

Figure 5:
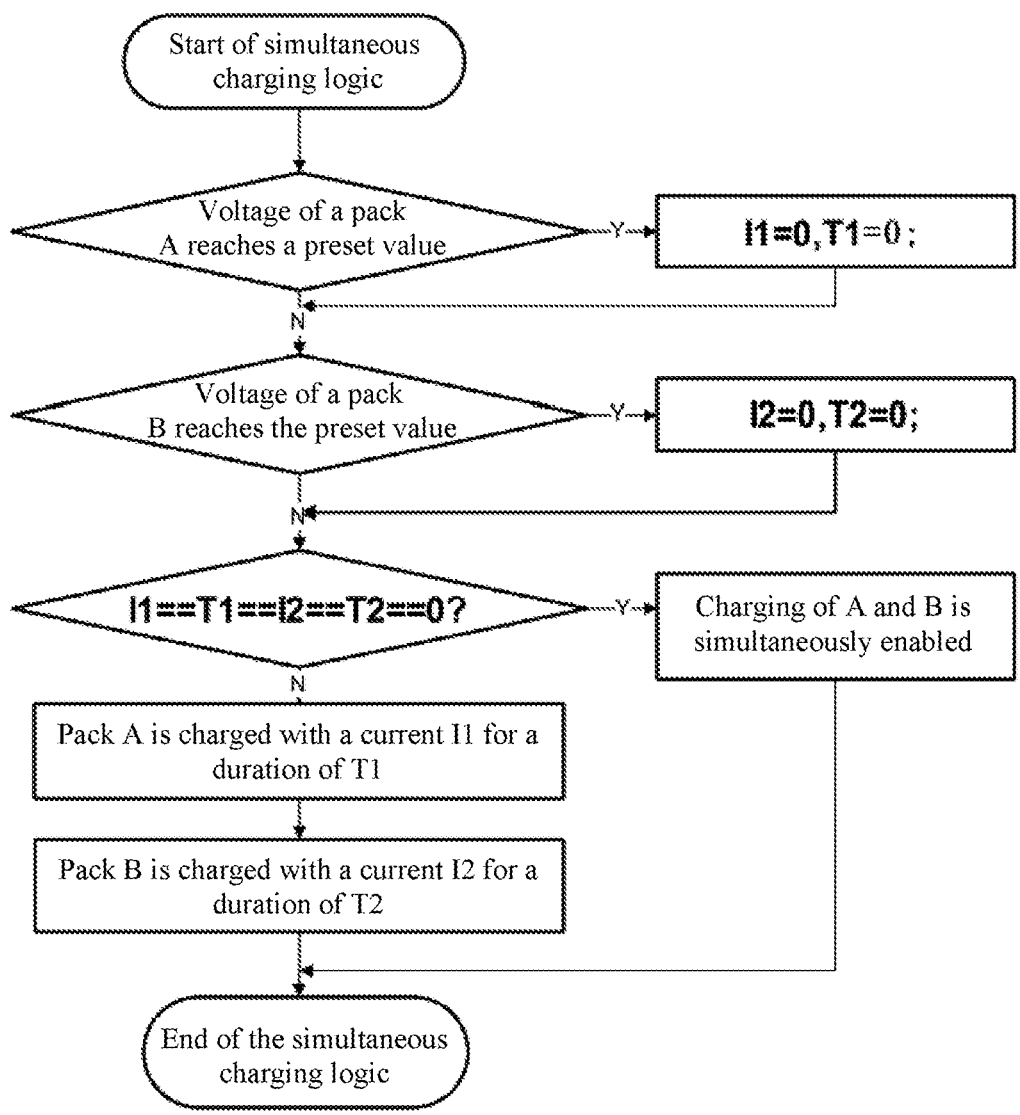
FIG. 5 is a schematic flowchart of a second charging phase of a charging method according to the present invention.

In particular, referring to FIG. 5, during the charging, the voltages of the pack A and the pack B are detected to determine whether the voltage of the pack A reaches the preset voltage, that is, whether the voltage reaches the preset value. If so, charging of the pack A is controlled to be stopped. In this case, the charging current I1 for the pack A is 0, and the charging duration T1 is 0. Otherwise, it is determined whether the voltage of the pack B reaches the preset voltage, that is, whether the voltage reaches the preset value. If so, charging of the pack B is controlled to be stopped. In this case, the charging current I2 for the pack B is 0, the charging duration T2 is 0. Otherwise, it is determined whether I1=T1=I2=T2=0. If so, the pack A and the pack B are controlled to be simultaneously charged. If I1=T1=I2=T2=0 is not met, the charging current for the pack A is controlled to be I1, and the charging duration is controlled to be T1, the charging current for the pack B is controlled to be I2, and the charging duration is controlled to be T2.

Those skilled in the art may learn that, in the second charging phase, the first battery pack and the second battery pack are successively charged within a specific time period. For example, second charging phase-charging of the second battery pack starts after second charging phase-charging of the first battery pack lasts for 0.05 s. the first battery pack and the second battery pack can be simultaneously charged in parallel.

In the foregoing embodiment, the voltage threshold may be a fixed voltage value or a fluctuating voltage value, and a duration of the second charging phase is greater than a charging duration of the battery pack in the first charging phase. If the two battery packs are successively charged with a constant voltage, each battery pack needs a constant voltage charging phase. In this case, a relatively long time is required to complete charging of both the two battery packs. The controller of the present invention controls the first battery pack and the second battery pack to simultaneously enter the constant voltage phase, reducing a duration of the constant-voltage charging phase of the two battery packs and improving the charging efficiency.

The foregoing embodiments further include a step of: respectively obtaining the charging currents for the first battery pack and the second battery pack in the first charging phase.

A first battery parameter may be a number of charge/discharge cycles of the battery pack. Before charging is started, a number of charge/discharge cycles of the first battery pack and a number of charge/discharge cycles of the second battery pack are respectively obtained, and the numbers of charge/discharge cycles of the first battery pack and the second battery pack are respectively compared to data in a pre-stored charging current relationship table to find the charging currents respectively corresponding to the first battery pack and the second battery pack. The charging current relationship table includes a one-to-one correspondence between a number of charge cycles and a current.

A life of the first battery pack and a life of the second battery pack may be obtained through obtaining of the number of charge/discharge cycles of the first battery pack and the number of charge/discharge cycles of the second battery pack. The charging current is set according to the life of the battery pack, that is, a charging current set for a battery pack with a larger number of charge/discharge cycles is less than a charging current set for a battery pack with a smaller number of charge/discharge cycles. A specific value may be obtained through querying of the data in the pre-stored charging current relationship table. In this way, different charging currents may be set according to the lives of the battery packs, to prevent a short-life battery pack from being charged with a large current, thereby preventing the battery pack from being damaged.

The first battery parameter may also be a capacity of the battery pack. Before charging is started, a capacity of the first battery pack and a capacity of the second battery pack are respectively obtained, and the capacities of the first battery pack and the second battery pack are respectively compared to data in a pre-stored charging current relationship table to find the charging currents respectively corresponding to the first battery pack and the second battery pack. The charging current relationship table includes a one-to-one correspondence between a capacity and a current.

The charging current is set according to the obtained capacity of the first battery pack and the obtained capacity of the second battery pack. A charging current for a battery pack with a larger capacity is less than a charging current for a battery pack with a smaller capacity. A specific value may be obtained through querying of the data in the pre-stored charging current relationship table. Through setting of a larger charging current for a battery pack with a larger capacity, a duration of the battery pack in the first charging phase can be reduced, and after reaching the first preset voltage, the other battery pack does not need to enter a waiting state to wait for a voltage of the battery pack with a larger capacity to reach the first preset voltage, thereby saving time and improving charging efficiency.

Those skilled in the art may learn that the first battery parameter may be either the capacity of the battery pack or the number of charge/discharge cycles of the battery pack.

In the embodiments of the present invention, the internal and external parameters of the battery pack are detected, and the current used for the battery pack is intelligently adjusted according to the internal and external parameters of the battery pack to prevent the temperature of the battery pack from reaching the first preset value. Therefore, the battery pack can reach a highest charging effect without a need to enter over-temperature protection.

For the dual-pack charging device, not only the charging current for the battery pack can be adjusted using the parameter, but also the charging efficiency can be improved through the alternate charging. Through adjustment of the charging current and charging duration of the alternate charging, the charging current and the charging duration of the two battery packs with different voltages and temperatures during the alternate charging can be intelligently adjusted, so that the dual-pack charging device reach the highest charging efficiency.

Figure 6:
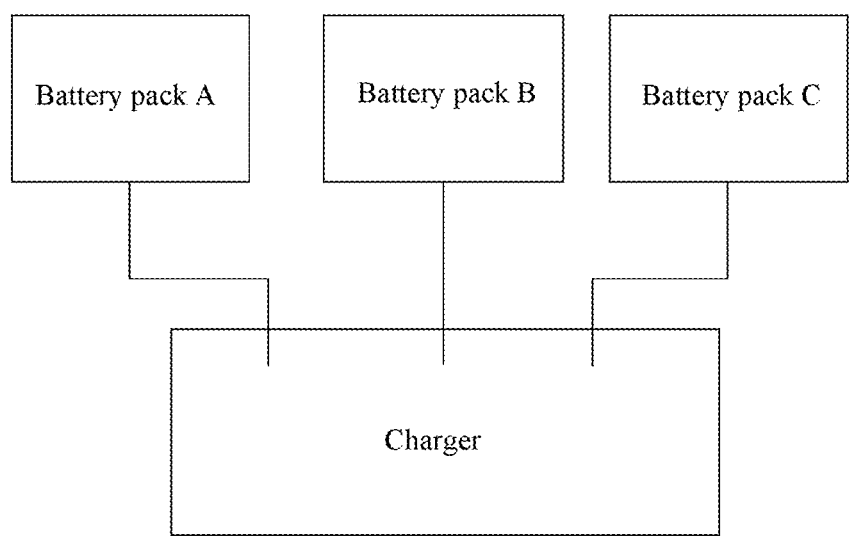
FIG. 6 is a schematic diagram of a connection between a charging device and a battery pack.
Figure 7:
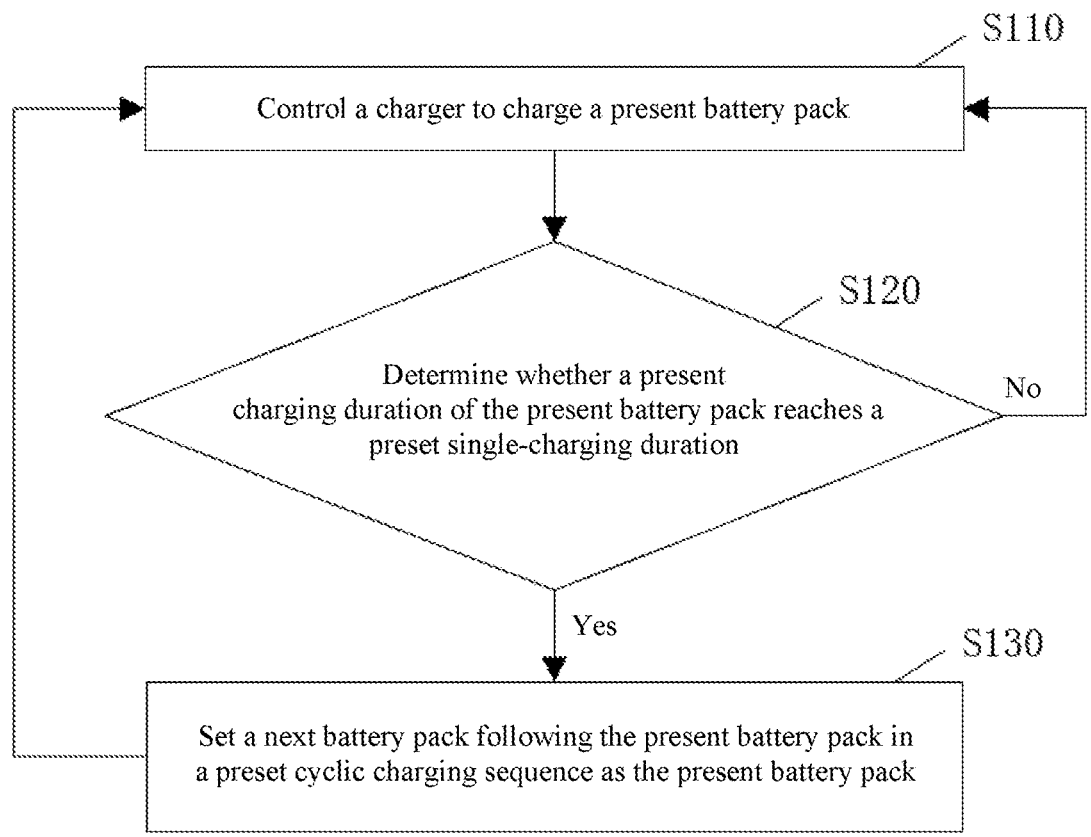
FIG. 7 is a schematic flowchart of a charging method according to an embodiment of the present invention.

FIG. 7 is a schematic flowchart of a charging method according to an embodiment of the present invention. The method is suitable for controlling charging of a plurality of battery packs when the plurality of battery packs is connected to a same charging device. The plurality of battery packs forms a preset cyclic charging sequence. The plurality of battery packs may be of different types, different models, different rated voltages, and different rated currents. For example, as shown in FIG. 6, battery packs A, B, and C are connected to the charging device. The charging device charges the three battery packs through the charging method provided in the embodiments of the present invention. It is assumed that the preset cyclic charging sequence is A-B-C-A-B-C . . . . As shown in FIG. 7, the method includes the following steps.

S110: The charging device is controlled to charge a present battery pack.

S120: It is determined whether a present charging duration of the present battery pack reaches a preset single-charging duration. When the present charging duration of the present battery pack reaches the preset single-charging duration, step S130 is performed; otherwise, step S110 continues to be performed.

The "present charging duration of the present battery pack" herein refers to an accumulated charging duration of the battery pack in a current cycle before a moment of performing the determining step.

The "preset single-charging duration" herein refers to a preset total accumulated charging duration of the battery pack in a one cyclic process during charging of the battery pack in a preset cyclic charging sequence. The battery packs may correspond to a same preset single-charging duration or different preset single-charging durations. For example, the preset single-charging duration corresponding to each battery pack is in a preset quantitative relationship with a charging voltage, a required charge amount, or a charging current thereof (for example, is in a direct proportional relationship with the required charge amount).

S130: A next battery pack following the present battery pack in the preset cyclic charging sequence is set as the present battery pack, and step S110 is performed.

At an initial moment of controlling the charging device to charge the battery pack, a first battery pack A in the preset cyclic charging sequence may be used as the present battery pack, or any of the battery packs may be randomly determined as the present battery pack.

Still in the example, it is assumed that the present battery pack is A, and the preset single-charging duration of the battery pack A is 30 seconds. First, the charging device is controlled to charge the present battery pack A.

It is determined for a first time whether the present charging duration of the present battery pack A reaches 30 seconds. If the present charging duration of the present battery pack A is less than 30 seconds, the charging device continues to be controlled to charge the battery pack.

If the present charging duration of the present battery pack A reaches 30 seconds, a next battery pack B following the battery pack A in the preset cyclic charging sequence is set as the present battery pack.

The charging device is controlled to charge a present battery pack B. It is assumed that a preset single-charging duration of the battery pack B is 40 seconds.

It is determined for a first time whether the present charging duration of the present battery pack B reaches 40 seconds. If the present charging duration of the present battery pack B is less than 40 seconds, the charging device continues to be controlled to charge the battery pack.

If the present charging duration of the present battery pack B reaches 40 seconds, a next battery pack C following the battery pack B in the preset cyclic charging sequence is set as the present battery pack.

The charging device is controlled to charge a present battery pack C. It is assumed that a preset single-charging duration of the battery pack C is 50 seconds.

It is determined for a first time whether the present charging duration of the present battery pack C reaches 50 seconds. If the present charging duration of the present battery pack C is less than 50 seconds, the charging device continues to be controlled to charge the battery pack.

If the present charging duration of the present battery pack c reaches 50 seconds, a next battery pack A following the battery pack C in the preset cyclic charging sequence is set as the present battery pack. So far, a first cycle of the preset cyclic charging sequence is completed.

Figure 8:
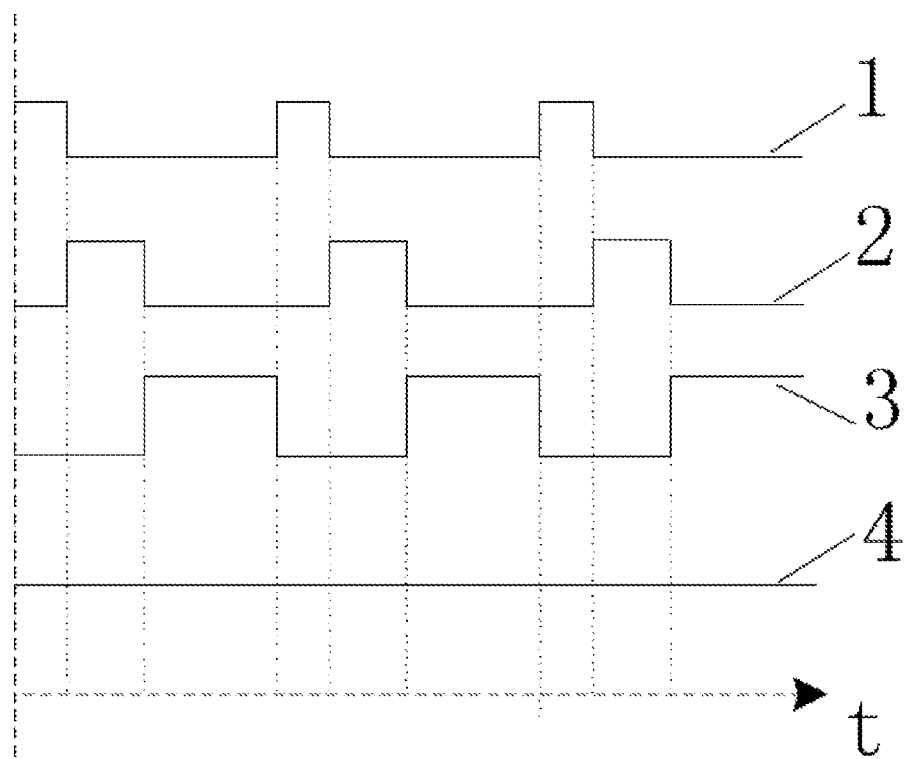
FIG. 8 illustrates a charging waveform of each battery pack and an output waveform of a charging device existing during charging of a plurality of battery packs according to an embodiment of the present invention.

In the foregoing charging manner, the charging device continues to output a voltage or a current, and a single battery pack is charged in a pulse charging manner. As shown in FIG. 8, a horizontal axis represents a time, a line 1 represents a charging voltage or a charging current for the battery pack A, a line 2 represents a charging voltage or a charging current for the battery pack B, a line 3 represents a charging voltage or a charging current for the battery pack C, and a line 4 represents an output voltage or an output current of the charging device. It should be supplemented that the line 4 shows only a case in which charging voltages or charging currents of the battery packs are the same. In fact, the charging voltages or the charging currents of the battery packs may be different.

For a plurality of battery packs, in a conventional charging method, a battery pack is first charged fully, and then other battery packs are charged. However, when a charging current is relatively large, there is a battery polarization phenomenon in the battery pack. Consequently, charging speeds during charging at currents of 6A and 4A may be the same. Therefore, in the conventional charging method, a single battery pack cannot be charged with a relatively large current. However, in the charging method in this application, a single battery pack is charged in a pulse charging manner, that is, the battery pack is first charged with a relatively large charging current, and then charging is stopped for a specific time period to wait for the polarization phenomenon in the battery pack to disappear, so that the battery pack may still be charged with a relatively large charging current during next time of charging of the battery pack, thereby reducing an overall charging duration for the single battery pack and an overall charging duration for a plurality of battery packs.

It may be learned from the foregoing analysis that, according to the charging device provided in this application, on the one hand, the single battery pack is charged in a pulse charging manner, so that the battery pack may be charged with a relatively large charging current, thereby reducing the charging duration of the single battery pack; and there is a time interval between two times of charging of the single battery pack, so that a service life of the battery pack is prevented from being reduced as a result of heating of the battery pack after charging for a long time; on the other hand, other battery packs are charged within a pulse charging time interval of a battery pack to make full use of the charging time interval, so that the overall charging duration of the plurality of battery packs can be reduced.

It should be supplemented that the "battery pack" in this application may be a battery pack consisting of a plurality of battery cells, or a single battery cell (a battery pack consists of one battery cell).

Figure 9:
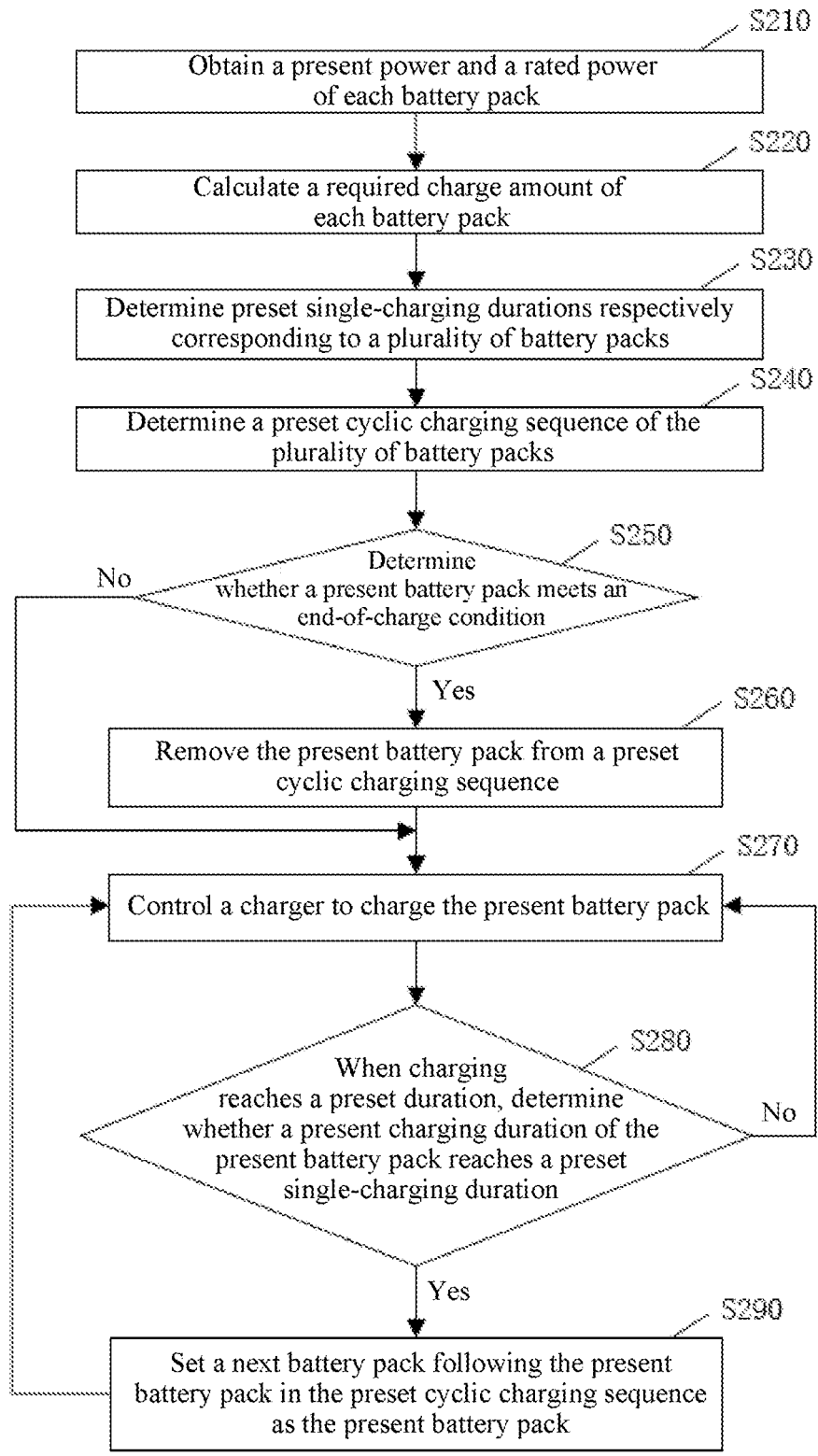
FIG. 9 is a schematic flowchart of another charging method according to an embodiment of the present invention.

FIG. 9 is a schematic flowchart of another charging method according to an embodiment of the present invention. The method is suitable for controlling charging of a plurality of battery packs when the plurality of battery packs is connected to a same charging device. The plurality of battery packs forms a preset cyclic charging sequence. The plurality of battery packs may be of different types, different models, different rated voltages, and different rated currents. For example, as shown in FIG. 1, battery packs A, B, and C are connected to the charging device. The charging device charges the four battery packs through the charging method provided in the embodiments of the present invention. It is assumed that the preset cyclic charging sequence is A-B-C-A-B-C- . . . . As shown in FIG. 9, the method includes the following steps.

S210: A present power and a rated power of each battery pack are obtained.

Optionally, a present voltage of each battery pack may be obtained first, and then the present power of the battery pack may be estimated according to a correspondence between the voltage and the power of the battery pack. Alternatively, the present power of the battery pack may be obtained through accumulation of the charging current for the battery pack with the time. The manner of obtaining the present power of the battery pack is not limited in this application.

The rated power of the battery pack may be pre-stored and is in a one-to-one correspondence with an identifier of the battery pack, so that the rated the power of the battery pack can be obtained according to the identifier of the battery pack.

S220: A required charge amount of each battery pack is calculated, the required charge amount being a difference between the rated power and the present power.

S230: Preset single-charging durations respectively corresponding to a plurality of battery packs are determined, a ratio among the preset single-charging durations of the plurality of battery packs being the same as a ratio among required charge amounts.

The example in the first embodiment is still used. A ratio among required charge amounts of the battery packs A, B, and C is 3:4:5, and therefore it is determined that preset single-charging durations of the battery packs A, B, and C are 30 seconds, 40 Seconds, and 50 seconds, so that charging of the battery packs A, B, and C can be simultaneously completed to be simultaneously used by a user.

S240: A preset cyclic charging sequence of the plurality of battery packs is determined.

For example, a preset cyclic charging sequence of A-B-C-A-B-C- . . . is determined, that is, the battery pack A is charged first, then the battery pack B is charged, and then the battery pack C is charged to complete a cycle. The battery packs A, B, and C are respectively charged according to the sequence, to complete a second cycle, and so on.

S250: It is determined whether a present battery pack meets an end-of-charge condition. When the present battery pack meets the end-of-charge condition, step S260 is performed; otherwise, step S270 is performed.

The end-of-charge condition may be that voltages at two ends of the battery pack reach a predetermined voltage, or that a charging current for the battery pack reaches a predetermined charging current.

S260: The present battery pack is removed from the preset cyclic charging sequence.

S270: The charging device is controlled to charge the present battery pack.

S280: When charging reaches a preset duration, it is determined whether a present charging duration of the present battery pack reaches a preset single-charging duration. When the present charging duration of the present battery pack reaches the preset single-charging duration, step S290 is performed; otherwise, step S270 continues to be performed.

The "preset duration" herein is a time interval for performing a determining operation.

The "present charging duration of the present battery pack" herein refers to a charging duration of the battery pack in a one cyclic process during charging of the battery pack in a preset cyclic charging sequence.

S290: A next battery pack following the present battery pack in the preset cyclic charging sequence is set as the present battery pack, and step S270 is performed.

Still in the example, it is assumed that the present battery pack is A, the preset single-charging duration of the battery pack A is 30 seconds, and the preset duration (that is, the time interval for performing a determining operation) is five seconds. First, the charging device is controlled to charge the present battery pack A.

It is determined at a fifth second of the charging whether the present charging duration of the present battery pack A reaches 30 seconds. Since it is determined for the first time that the present charging duration of the present battery pack A is less than 30 seconds, the charging device continues to be controlled to charge the battery pack.

At a sixth time of determining, the present charging duration of the present battery pack A reaches 30 seconds. In this case, a next battery pack B following the battery pack A in the preset cyclic charging sequence is set as the present battery pack.

The charging device is controlled to charge the present battery pack B. It is assumed that a preset single-charging duration of the battery pack B is 40 seconds, and the preset duration is five seconds.

It is determined at a fifth second of the charging whether the present charging duration of the present battery pack B reaches 40 seconds. Since it is determined for the first time that the present charging duration of the present battery pack B is less than 40 seconds, the charging device continues to be controlled to charge the battery pack.

At an eighth time of determining, the present charging duration of the present battery B reaches 40 seconds. In this case, a next battery pack C following the battery pack B in the preset cyclic charging sequence is set as the present battery pack.

The charging device is controlled to charge the present battery pack C. It is assumed that a preset single charge duration of the battery pack C is 50 seconds, and the preset duration is five seconds.

It is determined at a fifth second of the charging whether the present charging duration of the present battery pack C reaches 50 seconds. Since it is determined for the first time that the present charging duration of the present battery pack C is less than 50 seconds, the charging device continues to be controlled to charge the battery pack.

At a tenth time of determining, the present charging duration of the present battery C reaches 50 seconds. In this case, a next battery pack A following the battery pack C in the preset cyclic charging sequence is set as the present battery pack. So far, a first cycle of the preset cyclic charging sequence is completed.

Figure 10:
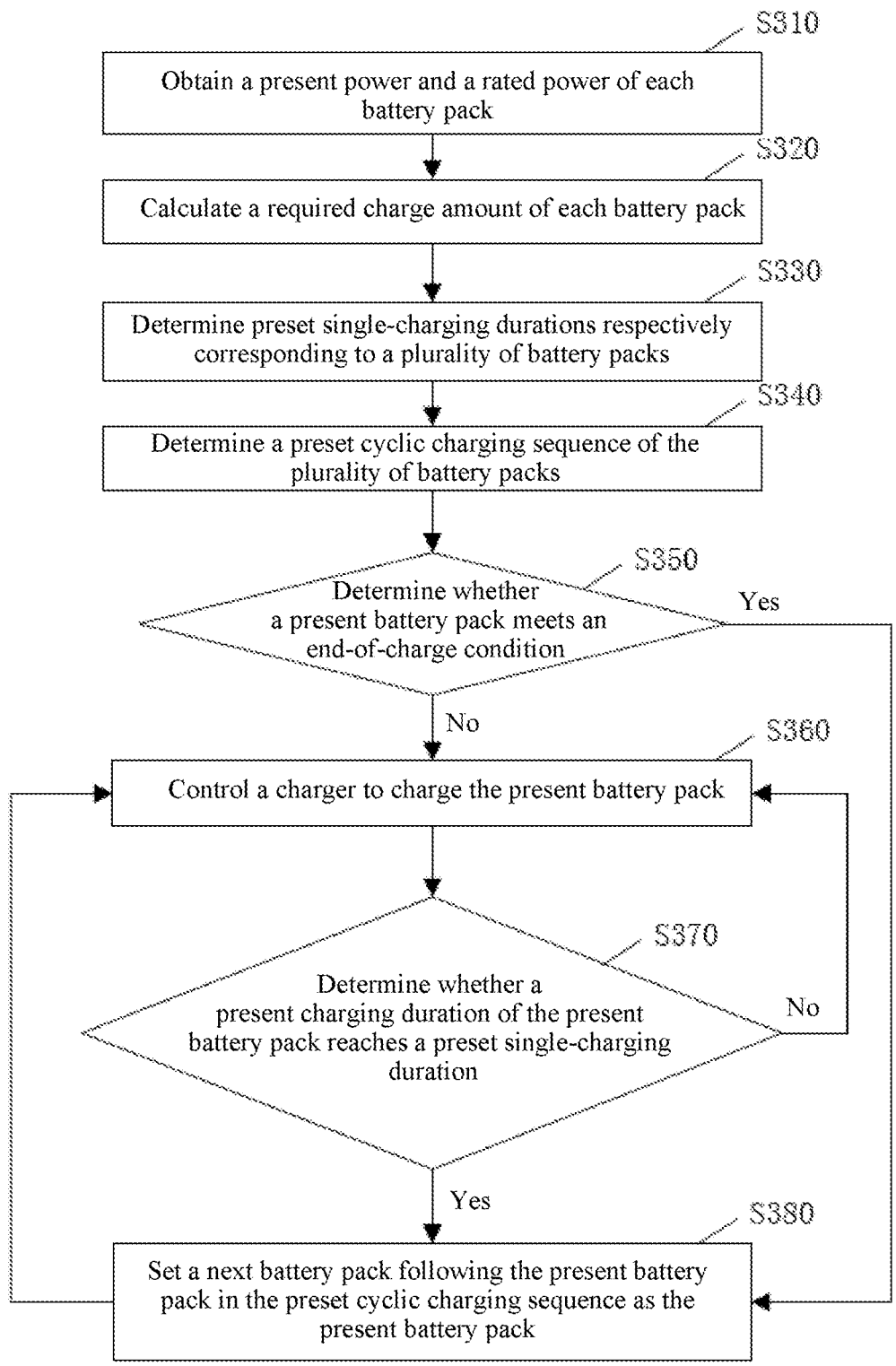
FIG. 10 is a schematic flowchart of still another charging method according to an embodiment of the present invention.

FIG. 10 is a schematic flowchart of still another charging method according to an embodiment of the present invention. The method is suitable for controlling charging of a plurality of battery packs when the plurality of battery packs is connected to a same charging device. The plurality of battery packs forms a preset cyclic charging sequence. The plurality of battery packs may be of different types, different models, different rated voltages, and different rated currents. For example, as shown in FIG. 6, battery packs A, B, and C are connected to the charging device. The charging device charges the three battery packs through the charging method provided in the embodiments of the present invention. It is assumed that the preset cyclic charging sequence is A-B-C-A-B-C- . . . . As shown in FIG. 10, the method includes the following steps.

S310: A current power and a rated power of each battery pack are obtained.

S320: A required charge amount of each battery pack is calculated, the required charge amount being a difference between the rated power and the present power.

S330: Preset single-charging durations respectively corresponding to a plurality of battery packs are determined, a ratio among the preset single-charging durations of the plurality of battery packs being the same as a ratio among required charge amounts.

S340: A preset cyclic charging sequence of the plurality of battery packs is determined.

For the foregoing steps S310, S320, S330, and S340, refer to S210, S220, S230, and S240 in the first embodiment, and details are not described herein again.

S350: It is determined whether the present battery pack meets an end-of-charge condition; and when the present battery pack meets the end-of-charge condition, step S380 is performed; otherwise, step S360 is performed.

The end-of-charge condition may be that voltages at two ends of the battery pack reach a predetermined voltage, or that a charging current for the battery pack reaches a predetermined charging current.

S360: The charging device is controlled to charge a present battery pack.

S370: It is determined whether a present charging duration of the present battery pack reaches a preset single-charging duration. When the present charging duration of the present battery pack reaches the preset single-charging duration, step S380 is performed; otherwise, step S360 continues to be performed.

The "present charging duration of the present battery pack" herein refers to a charging duration of the battery pack in a one cyclic process during charging of the battery pack in a preset cyclic charging sequence.

S380: A next battery pack following the present battery pack in the preset cyclic charging sequence is set as the present battery pack, and step S360 is performed.

For the steps S360, S370, and S380, refer to S110, S120, and S130 in the first embodiment or S270, S280, and S290 in the second embodiment, and details are not described herein again.

Figure 11:
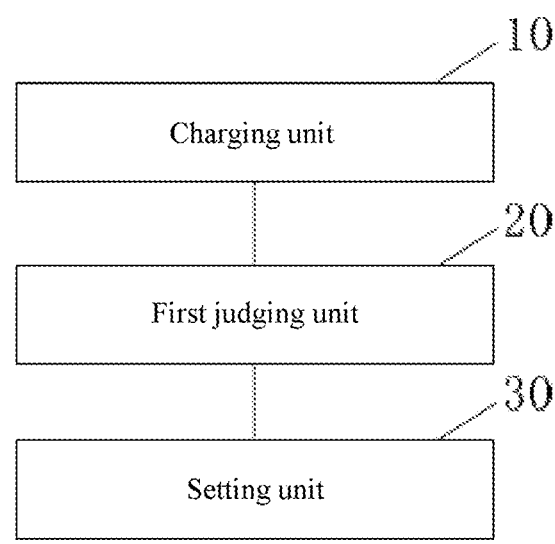
FIG. 11 is a schematic block diagram of a charging device according to an embodiment of the present invention.

FIG. 11 is a schematic block diagram of a charging device according to an embodiment of the present invention. The device is suitable for controlling charging of a plurality of battery packs when the plurality of battery packs is connected to a same charging device. The plurality of battery packs forms a preset cyclic charging sequence. The plurality of battery packs may be of different types, different models, different rated voltages, and different rated currents. For example, as shown in FIG. 6, battery packs A, B, and C are connected to the charging device. The charging device charges the three battery packs through the charging method provided in the embodiment of the present invention. It is assumed that the preset cyclic charging sequence is A-B-C-A-B-C- . . . . As shown in FIG. 11, the device includes a charging unit 10, a first judging unit 20, and a setting unit 30, and is configured to perform the charging method according to the first embodiment.

The charging unit 10 is configured to control the charging device to charge a present battery pack.

The first judging unit 20 is configured to determine whether a present charging duration of the present battery pack reaches a preset single-charging duration.

The setting unit 30 is configured to set a next battery pack following the current battery pack in a preset cyclic charging sequence as the present battery pack.

The charging device provided performs the charging method in the first embodiment. On the one hand, the single battery pack is charged in a pulse charging manner, so that the battery pack may be charged with a relatively large charging current, thereby reducing the charging duration of the single battery pack; and there is a time interval between two times of charging of the single battery pack, so that a service life of the battery pack is prevented from being reduced as a result of heating of the battery pack after charging for a long time. On the other hand, other battery packs are charged within a pulse charging time interval of a battery pack to make full use of the charging time interval, so that the overall charging duration of the plurality of battery packs can be reduced.

Figure 12:
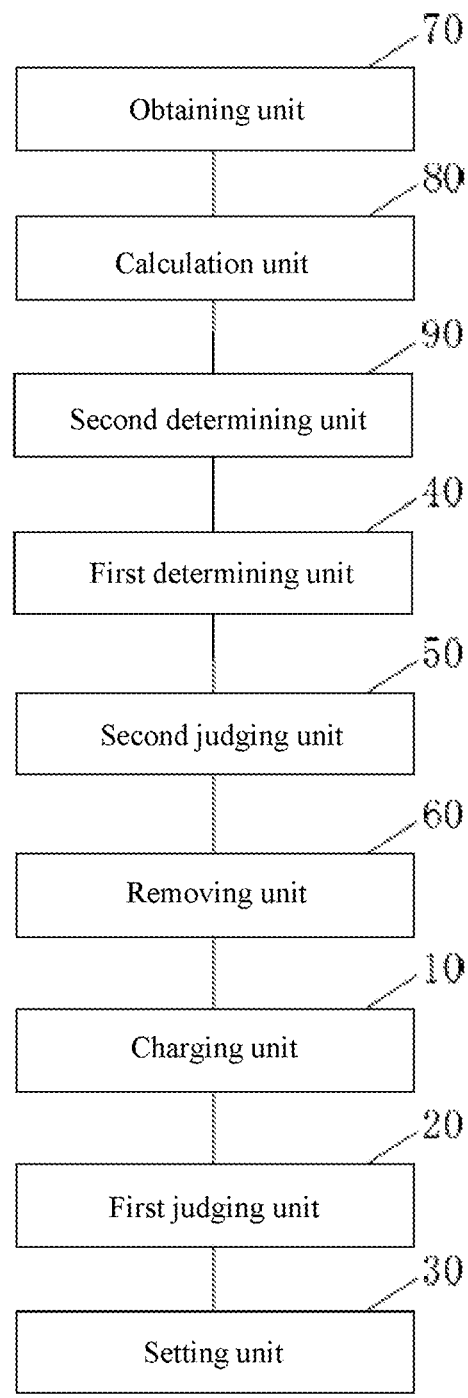
FIG. 12 is a schematic block diagram of another charging device according to an embodiment of the present invention.

FIG. 12 is a schematic block diagram of another charging device according to an embodiment of the present invention. The device is suitable for controlling charging of a plurality of battery packs when the plurality of battery packs is connected to a same charging device. The plurality of battery packs forms a preset cyclic charging sequence. The plurality of battery packs may be of different types, different models, different rated voltages, and different rated currents. For example, as shown in FIG. 6, battery packs A, B, and C are connected to the charging device. The charging device charges the three battery packs through the charging method provided in the embodiments of the present invention. It is assumed that the preset cyclic charging sequence is A-B-C-A-B-C- . . . . As shown in FIG. 12, the device includes a charging unit 10, a first judging unit 20, a setting unit 30, a first determining unit 40, a second judging unit 50, a removing unit 60, a obtaining unit 70, a calculation unit 80, and a second determining unit 90, and is configured to perform the charging method in the second embodiment.

The charging unit 10 is configured to control the charging device to charge a present battery pack.

The first judging unit 20 is configured to determine whether a present charging duration of the present battery pack reaches a preset single-charging duration.

The setting unit 30 is configured to set a next battery pack following the current battery pack in a preset cyclic charging sequence as the present battery pack.

The first determining unit 40 is configured to determine a preset cyclic charging sequence of a plurality of battery packs.

The second judging unit 50 is configured to determine whether a present battery pack meets an end-of-charge condition.

The removing unit 60 is configured to remove the present battery pack from the preset cyclic charging sequence when the present battery pack meets the end-of-charge condition.

The obtaining unit 70 is configured to obtain a present power and a rated power of each battery pack.

The calculation unit 80 is configured to calculate a required charge amount of each battery pack, the required charge amount being a difference between the rated power and the present power.

The second determining unit 90 is configured to respectively determine preset single-charging durations corresponding to a plurality of battery packs, a ratio among the preset single-charging durations of the plurality of battery packs being the same as a ratio among required charge amounts.

Figure 13:
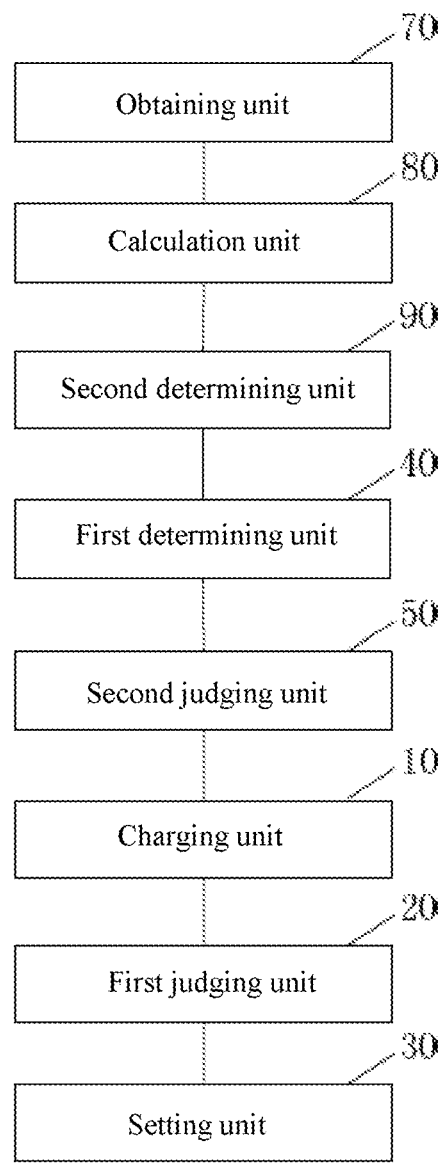
FIG. 13 is a schematic block diagram of still another charging device according to an embodiment of the present invention.

FIG. 13 is a schematic block diagram of still another charging device according to an embodiment of the present invention. The device is suitable for controlling charging of a plurality of battery packs when the plurality of battery packs is connected to a same charging device. The plurality of battery packs forms a preset cyclic charging sequence. The plurality of battery packs may be of different types, different models, different rated voltages, and different rated currents. For example, as shown in FIG. 6, battery packs A, B, and C are connected to the charging device. The charging device charges the three battery packs through the charging method provided in the embodiments of the present invention. It is assumed that the preset cyclic charging sequence is A-B-C-A-B-C- . . . . As shown in FIG. 13, the device includes a charging unit 10, a first judging unit 20, a setting unit 30, a first determining unit 40, a second judging unit 50, an obtaining unit 70, a calculation unit 80, and a second determining unit 90, and is configured to perform the charging method in the third embodiment.

The charging unit 10 is configured to control the charging device to charge a present battery pack.

The first judging unit 20 is configured to determine whether a present charging duration of the present battery pack reaches a preset single-charging duration.

The setting unit 30 is configured to set a next battery pack following the current battery pack in a preset cyclic charging sequence as the present battery pack.

The first determining unit 40 is configured to determine a preset cyclic charging sequence of a plurality of battery packs.

The second judging unit 50 is configured to determine whether a present battery pack meets an end-of-charge condition.

The obtaining unit 70 is configured to obtain a present power and a rated power of each battery pack.

The calculation unit 80 is configured to calculate a required charge amount of each battery pack, the required charge amount being a difference between the rated power and the present power.

The second determining unit 90 is configured to respectively determine preset single-charging durations corresponding to a plurality of battery packs, a ratio among the preset single-charging durations of the plurality of battery packs being the same as a ratio among required charge amounts.

Various technical features in the foregoing embodiments may be combined randomly. For ease of description, possible combinations of various technical features in the foregoing embodiments are not all described. However, the combinations of the technical features should be considered as falling within the scope recorded in this specification provided that the combinations of the technical features are compatible with each other.

The foregoing embodiments only describe several implementations of the embodiments of the present invention, and their description is specific and detailed, but cannot therefore be understood as a limitation to the patent scope of the embodiments of the present invention. It should be noted that, a person of ordinary skill in the art may make various changes and improvements without departing from the ideas of the embodiments of the present invention, which shall fall within the protection scope of the present invention. Therefore, the protection scope of the patent of the present invention shall be topic to the claims.

What is claimed is:

1. A charging device for charging a battery pack, the battery pack being detachably mounted on a power tool to provide power to the power tool, the charging device comprising:
 a parameter detecting unit configured to detect a parameter related to a charging current for the battery pack, the parameter comprising a temperature of the battery pack;
 a control unit configured to adjust the charging current for the battery pack according to at least part of an output of the parameter detecting unit,
 wherein when the temperature of the battery pack reaches a first preset temperature, the charging device enters an over-temperature protection state;
 a first charging interface; and
 a second charging interface,
 wherein the battery pack comprises a first battery pack and a second battery pack, the first battery pack and the second battery pack being electrically connected to the first charging interface and the second charging interface respectively;
 wherein a charging process in which the charging device charges the first battery pack and the second battery pack comprises:
  a first charging phase, and
  a second charging phase;
  wherein a value of a charging current output by the charging device in the first charging phase is greater than a value of a charging current output in the second charging phase, and
  wherein the charging device controls the charging current to alternately charge the first battery pack and the second battery pack in the first charging phase, and controls the charging current to simultaneously charge the first battery pack and the second battery pack in the second charging phase.

2. The charging device according to claim 1, wherein the parameter detecting unit is further configured to detect a voltage of the battery pack, and
wherein the control unit is configured to adjust the charging current for the battery pack according to at least one of the temperature and the voltage of the battery pack output by the parameter detecting unit to prevent the temperature of the battery pack from reaching the first preset temperature.

3. The charging device according to claim 2, wherein the parameter detecting unit is further configured to detect an ambient temperature, and
wherein the control unit is configured to adjust the charging current for the battery pack according to at least one of the temperature of the battery pack, the voltage of the battery pack, and the ambient temperature output by the parameter detecting unit, to prevent the temperature of the battery pack from reaching the first preset temperature.

4. The charging device according to claim 1, wherein the control unit adjusts a value of the charging current for the battery pack by adjusting a duty cycle.

5. The charging device according to claim 1, wherein charging currents of the first battery pack and the second battery pack are adjusted by at least one of the following manner:
adjusting values of the charging currents for the first battery pack and the second battery pack, and
adjusting charging durations of each charging in a process of alternately charging the first battery pack and the second battery pack.

6. The charging device according to claim 5, further comprising:
a comparison module configured to determine whether a difference between the parameter of the first battery pack and the parameter of the second battery pack is greater than a preset value,
wherein when the difference is greater than the preset value, the control unit controls a value of a charging current for a battery pack with a larger parameter to be reduced and/or a charging duration of each charging of a battery pack with a larger parameter during the alternate charging to be reduced.

7. The charging device according to claim 1, wherein the control unit comprises:
a single controller, connected to the first battery pack and the second battery pack respectively, and configured to control the first battery pack and the second battery pack to be alternately charged.

8. The charging device according to claim 1, further comprising:
a storage module configured to store a correspondence table between the parameter and the charging current,
wherein the control unit controls the charging current for the battery pack according to the correspondence table.

9. A charging method for charging a battery pack, the battery pack being detachably mounted on a power tool to provide power to the power tool, the charging method comprising:
detecting a parameter related to a charging current for the battery pack, the parameter comprising a temperature of the battery pack; and
adjusting the charging current for the battery pack according to at least part of a detected parameter,
wherein when the temperature of the battery pack reaches a first preset temperature, a charging device enters an over-temperature protection state;
wherein the charging device comprises:
a first charging interface, and
a second charging interface, and
wherein the battery pack comprises a first battery pack and a second battery pack, the first battery pack and the second battery pack being electrically connected to the first charging interface and the second charging interface respectively, and
wherein the charging method further comprises:
a charging process in which the charging device charges the first battery pack and the second battery pack comprises:
a first charging phase, and
a second charging phase,
wherein a value of a charging current output by the charging device in the first charging phase is greater than a value of a charging current output in the second charging phase, the charging device controls the charging current to alternately charge the first battery pack and the second battery pack in the first charging phase, and controls the charging current to simultaneously charge the first battery pack and the second battery pack in the second charging phase.

10. The charging method according to claim 9, wherein the parameter further comprises:
a voltage of the battery pack, and
wherein the step of adjusting the charging current for the battery pack according to at least part of a detected parameter comprises:
adjusting the charging current for the battery pack according to at least one of the temperature and the voltage of the battery pack.

11. The charging method according to claim 10, wherein the parameter further comprises:
an ambient temperature, and
wherein the step of adjusting the charging current for the battery pack according to at least part of a detected parameter comprises:
adjusting the charging current for the battery pack according to at least one of the temperature of the battery pack, the voltage of the battery pack, and the ambient temperature.

12. The charging method according to claim 9, wherein the charging currents for the first battery pack and the second battery pack are adjusted at least one of the following manner:
adjusting values of the charging currents for the first battery pack and the second battery pack, and
adjusting charging durations of each charging in a process of alternately charging the first battery pack and the second battery pack.

13. The charging method according to claim 12, further comprising:
determining whether a difference between the parameter of the first battery pack and the parameter of the second battery pack is greater than a preset value; and
wherein when the difference is greater than the preset value, controlling, by the control unit, a value of a charging current for a battery pack with a larger parameter to be reduced and/or a charging duration of each charging of a battery pack with a larger parameter during the alternate charging to be reduced.

14. The charging method according to claim 9, further comprising:
    pre-storing a correspondence table between the parameter and the charging current, and
    controlling the charging current for the battery pack according to the correspondence table.

\* \* \* \* \*